United States Patent Office 3,453,250
Patented July 1, 1969

3,453,250
CYCLIC POLYENE/MONO-OLEFIN COPOLYMER-IZATES AND PROCESSES FOR PRODUCING THEM
Giulio Natta, Giorgio Mazzanti, Alberto Valvassori, Gino Dall'Asta, and Guido Sartori, Milan, Italy, assignors to Montecatini Edison S.p.A., a corporation of Italy
No Drawing. Filed Oct. 16, 1962, Ser. No. 231,033
Claims priority, application Italy, Apr. 30, 1962, 8,594/62
Int. Cl. C08f *1/42, 15/04*
U.S. Cl. 260—88.2          29 Claims

ABSTRACT OF THE DISCLOSURE

High molecular weight copolymerizates of alpha-olefin and polyenes selected from the group consisting of monocyclic non-conjugated polyenes and the process for their production.

---

This invention relates to linear, high molecular weight, unsaturated copolymers of non-conjugated cyclic polyenes or alkyl polyenes with ethylene or a higher alpha-olefin.

It is known that cyclic non-conjugated polyenes and alkyl polyenes are not homopolymerized in the presence of catalysts acting through anionic coordinated mechanism.

Work done in our laboratories established that the non-conjungated cyclic polyenes and alkyl-substituted cyclic polyenes could be copolymerized with ethylene and at least one higher alpha-olefin of the formula $CH_2=CHR$ in which R is an alkyl group containing 1 to 6 carbon atoms, to amorphous, unsaturated, vulcanizable terpolymers consisting essentially of macromolecules each containing units of all of the starting monomers.

We have now found, according to the present invention, that by using catalytic systems obtained by mixing vanadium compounds and aluminum organic compounds or hydrides, it is possible to produce linear, high molecular weight unsaturated copolymers of non-conjugated cyclic polyenes or alkyl polyenes and either ethylene or a higher alpha-olefin, in which copolymers two polyene monomeric units are never directly linked, to each other, such units being dispersed along the polymeric chains. As evidence of the distribution of the units derived from the cyclic polyene or alkyl-substituted polyene, along the copolymeric macromolecular main chain, we have observed that even when the molar ratio between the monoolefin and cyclic polyene in the liquid phase in which polymerization occurs is low, copolymers containing more than 50% in moles, of monomeric units deriving from the cyclic polyene are not obtained.

In our copolymers containing 50% by moles of cyclic polyene units and 50% by moles of mono-olefin units, the marcomolecular main chain is made up of a regular succession of single monoolefin units alternating with single units of the cyclic polyene.

In these new copolymerizates, each of the monomeric units deriving from the cyclic polyene still contains one or more free unsaturations (double bonds). This means that one of the double bonds present in the starting cyclic polyene behaves in a different way than others of said double bonds, or more specifically, that one of the double bonds of the starting cyclic polyene is saturated as a result of formation of the copolymer, whereas others of the double bonds of the starting cyclic polyene are inert to polymerization and are not involved in the growth of the macromolecules, which are, therefore essentially linear and contain unsaturated cyclic groups.

Unconjugated cyclic polyenes or alkyl-substituted cyclic polyenes which can be copolymerized with ethylene or with a higher alphaolefin according to the present invention are, for example:

cycloheptadiene-1,4;
cyclooctadiene-1,5;
cyclooctadiene-1,4;
cyclodecadiene-1,5;
cyclodecadiene-1,6;
cyclododecadiene-1,7;
cyclododecatriene-1,5,9;
1-methyl cyclooctadiene-1,5;
3-methyl cyclooctadiene-1,5;
3,4-dimethylcyclooctadiene-1,5;
3,7-dimethylcyclooctadiene-1,5.

The monoolefin copolymerized with the cyclic polyene is preferably selected from those having the general formula $R—CH=CH_2$ wherein R is hydrogen or an alkyl group containing from 1 to 6 carbon atoms, and especially ethylene, propylene or butene-1. Particularly interesting are the copolymers of the cyclic polyenes with ethylene.

The copolymerizates of this invention may be amorphous or crystalline depending on the mole percent of ethylene in the copolymeric main chain.

Thus, the copolymerizates show crystallinity of the polyethylene type when the copolymeric main chain contains approximately 70 mol percent, or more than 70 mol percent, of ethylene, whereas when the copolymeric main chain contains less than about 70 mol percent of ethylene, the copolymers are completely amorphous under X-rays and soluble in boiling heptane.

The amorphous copolymers of this invention are particularly valuable, being vulcanizable with sulphur-containing vulcanization recipes to elastomers having good mechanical properties.

The copolymers clearly show, on infrared examination, absorption bands at about 6 micron due to the presence of the unsaturations therein.

The new copolymers of this invention are obtained by copolymerizing the cyclic polyene and either ethylene or a higher alpha-olefin in contact with catalysts obtained by mixing vanadium compounds with organometallic compounds or hydrides of aluminum or mixtures thereof.

The vanadaium compounds is preferably one that is soluble in the liquid medium in which the copolymerization is carried out, and which may be an inert hydrocarbon solvent.

Suitable vanadium compounds are the halides and oxyhalides, such as $VCl_4$, $VOCl_3$, $VBr_4$, and compounds of vanadium in which at least one of the valences of the vanadium is saturated by a heteroatom (particularly oxygen or nitrogen) linked to an organic group, including vanadium triacetylacetonate, tribenzoylacetonate, vanadyl diacetylacetonate and halogen-acetylacetonates, trialcoholates and haloalcoholates, vanadium tri- or tetrachloride tetrahydrofuranates, etherates, and aminates, vanadyl trichloride tetrahydrofuranates, etherates and aminates, vanadium tri- or tetrachloride pyridinates, and vanadyl trichloride pyridinates. Vanadium compounds which are insoluble in hydrocarbons may also be used in preparing the catalysts, particularly the organic salts such as e.g. vanadium triacetate, tribenzoate and tristearate.

Useful organometallic compounds or hydrides of aluminum include aluminum trialkyls, dialkyl aluminum monohalides, monoalkyl aluminum dihalides, aluminum alkenyls, aluminum alkylenes, aluminum cycloalkyls, aluminum cycloalkyl alkyls, aluminum aryls, aluminum alkylaryls, aluminum alkylhydrides, aluminum halohydrides and complexes of the above mentioned aluminum organic compounds with Lewis' weak bases.

Specific examples of the organometallic compounds of aluminum we can use in preparing the catalyst are aluminum triethyl,
aluminum triisobutyl,
aluminum trihexyl,
diethyl aluminum monochloride,
diethyl aluminum monoiodide,
diethyl aluminum monofluoride,
diisobutyl aluminum monochloride,
monoethyl aluminum dichloride,
aluminum butenyldiethyl,
aluminum isohexenyldiethyl,
2-methyl 1,4-bis(aluminum diisobutyl) butane, diisobutyl aluminum monochloride complexed with anisole, aluminum tri(cyclopentyl-methyl),
aluminum tri(dimethylcyclopentyl-methyl),
aluminum triphenyl,
aluminum tritolyl,
di(cyclopentyl) aluminum monochloride,
diphenyl aluminum monochloride,
aluminum diethylmonohydride,
aluminum diisobutyl monohydride,
aluminum monoethyl dihydride,
aluminum chlorohydride.

When the vanadium compound is a halide or oxyhalide, all of the compounds of aluminum yield equally effective catalysts, whereas when the vanadium compound is one having at least one of the vanadium valences satisfied by an oxygen or nitrogen atom linked to an organic group, the most effective catalysts are obtained by using halogen-containing compounds of aluminum as the second catalyst-forming component.

The copolymerization process of this invention may be carried out at temperatures between −80° and 125° C. When catalysts obtained from vanadium triacetylacetonate, vanadyl diacetylacetonates, vanadyl halogenacetylacetonates or, in general from a vanadium compound and an alkyl aluminum halide are used, it is useful to both prepare the catalyst and carry out the copolymerization at temperatures between 0° and −80° C., preferably between −10° and −50° C., in order to produce a high yield of the copolymer per unit weight of the catalyst.

Operating under the last-mentioned conditions, said catalysts show a much higher activity than do the same catalytic systems prepared at higher temperatures, and the catalyst activity remains practically unaltered with time.

If catalysts prepared from alkyl aluminum halides and vanadium triacetyl acetonate, vanadyl trialcoholates, or vanadyl haloalcoholates, at temperatures between 0° and 125° C. are used, it is useful to operate in the presence of particular complexing agents. The complexing agent may be an ether, a thioether, a tertiary amine or a tri-substituted phosphine containing at least one branched alkyl group or an aromatic group, in order to obtain a high yield of the copolymerizate. The complexing agent can be an ether of the formula R.Y.R' in which Y is oxygen or sulfur and R and R' each represent a linear or branched alkyl group containing from 1 to 14 carbon atoms or an aromatic nucleus containing from 6 to 14 carbon atoms, one of R and R' being a branched alkyl group or an aromatic nucleus; a tertiary amine of the formula

in which R to R'' each represent an alkyl group containing from 1 to 14 carbon atoms or an aromatic nucleus containing from 6 to 14 carbon atoms, one of R to R'' being an aromatic nucleus; or a tertiary phosphine

in which R to R'' each represent an alkyl radical containing from 1 to 14 carbon atoms or an aromatic nucleus containing from 6 to 14 carbon atoms, at least one of R to R'' being an aromatic nucleus.

The amount of complexing agent is preferably between 0.05 and 1.0 mole per mole of alkyl aluminum halide.

The activity of the catalysts used in this process varies, depending on the molar ratio between the vanadium compound and the organometallic aluminum compound.

We have found that, when the catalyst-forming components are an aluminum trialkyl and a vanadium halide or oxyhalide, it is convenient to employ catalysts in which the molar ratio between the aluminum trialkyl and vanadium compound is in the range from 1 to 5, preferably 2 to 4. On the other hand, when the catalyst is formed from an alkyl aluminum halide, such as diethyl aluminum monochloride $Al(C_2H_5)_2Cl$ and a vanadium compound of the type of vanadium triacetylacetonate ($VAc_3$) the best results are generally obtained with a molar ratio $Al(C_2H_5)_2Cl/VAc_3$ between 2 and 20, preferably between 4 and 10.

The cyclic polyene and either ethylene or a higher alpha-olefin can be copolymerized in an inert hydrocarbon solvent such as, for instance, butane, pentane, n-heptane, toluene and xylene or their mixtures.

As the liquid polymerization medium there may also be used halogenated hydrocarbons which are inert to the catalyst under the copolymerization conditions, such as chloroform, trichloroethylene, tetrachloroethylene, chlorobenzenes, etc.

The copolymerization can also be carried out in the absence of an extraneous inert solvent and using the monomers in their liquid state, that is in a solution of ethylene (or α-olefines) in the cyclic polyene to be copolymerized, maintained in the liquid state.

In order to obtain copolymers having a high composition homogeneity, it is desirable to maintain the ratio between the concentrations of the monomers to be copolymerized, present in the liquid phase, as constant as possible during the copolymerization.

The catalytic system used may be prepared in the absence of the monomers, or the catalyst components may be mixed together in the presence of the monomers to be copolymerized. The catalyst components may also be fed continuously during polymerization. The new copolymers of the present invention have a molecular weight, viscosimetically determined, in excess of 20,000, corresponding to an intrinsic viscosity in excess of 0.5 as determined in tetrahydronaphthalene at 135° C., or in toluene at 30° C. (G. Moraglio, "La Chimica e l'Industria," 41, 10 (1959), pages 984–987). The amorphous copolymers of the present invention, e.g. those containing, in the case of ethylene-cyclic polyene copolymers, less than 70% by moles of ethylene, have the properties of non-vulcanized elastomers. In fact, they have an initial low elastic modulus and a very high elongation at break.

Because the macromolecules forming these copolymers contain unsaturations, they can be vulcanized by the methods and recipes used conventionally for vulcanizing unsaturated rubbers, particularly the unsaturated rubbers of the low unsaturation type. A vulcanization recipe which can be adopted is, e.g., the following:

| | Parts by weight |
|---|---|
| Copolymer | 100 |
| Phenyl-β-naphthylamine | 1 |
| Sulphur | 2 |
| Zinc oxide | 5 |
| Tetramethylthiouram di-sulphide | 1 |
| Mercaptobenzothiazole | 0.5 |

Also weaker recipes can be used as, e.g., the following one:

| | Parts by weight |
|---|---|
| Copolymer | 100 |
| Phenyl-β-naphthylamine | 1 |
| Lauric acid | 1 |
| Zinc oxide | 5 |
| Sulphur | 1.5 |
| Cyclohexylbenzothiazol-sulphonamide | 1.5 |

An ethylene-polyene copolymer according to our invention and containing from 70 to 80% by mols of ethylene shows a slight crystallinity of the polyethylene type, but crystallinity is so low that it disappears when the copolymer is vulcanized. However, the crystallinity can appear again under stretch and imparts very good mechanical properties, such as high tensile strengths to the vulcanized, stretched product. The following examples are given to illustrate the invention and are not intended to be limiting.

Example 1

The reaction apparatus consists of a 3-necked pear-shaped flask, provided with stirrer and gas inlet and outlet tubes, dipped into a −20° C. thermostatic bath and kept under nitrogen.

50 cc. of cyclooctadiene-1,5 are introduced into the reactor. A mixture containing radioactive ethylene and nitrogen in the ratio of 1 to 85 is sent through the gas inlet tube and circulated at a rate of 30 Nl./h.

In a 50 cc. flask the catalyst is prepared at −20° C., under nitrogen atmosphere, by mixing 2 millimoles of vanadium tetrachloride and 10 millimoles of diethyl aluminum monochloride in 10 cc. of anhydrous n-heptane.

The catalyst so prepared is introduced into the reactor by means of nitrogen pressure. The ethylene-nitrogen mixture is continuously fed and discharged at a rate of 30 Nl./h. After 6 hours the reaction is blown off by the addition of 10 cc. of methanol containing 0.1 g. phenyl-beta-naphthylamine.

The product is purified in a separating funnel through several treatments with diluted hydrochloric acid and then with water and coagulated in acetone.

After vacuum drying, 1.1 g. of solid copolymer completely soluble in boiling n-heptane is obtained.

The radiochemical analysis of the copolymer shows it contains an amount of ethylene equal to 24% by weight, corresponding to 55% by moles. The infrared spectrographic examination shows the presence of unsaturations (6 micron band). Examination at the X-rays shows that the copolymer is amorphous and that the diffraction peak corresponds to an angle different from the angle which can be postulated for an amorphous polyethylene, proving that the product is actually a copolymer of the cyclooctadiene and ethylene, containing both units of ethylene and of cyclooctadiene-1,5 in the main chain.

Example 2

Into the reaction apparatus described in Example 1, thermostated at −20° C., there are introduced 50 cc. of cyclooctadiene-1,5.

From the gas inlet tube a mixture containing radioactive ethylene and nitrogen in 1 to 50 molar ratio is sent in and circulated at a rate of 30 Nl./h.

The catalyst is prepared in a 50 cc. flask by operating at −20° C. under nitrogen atmosphere and mixing 2 millimoles of vanadium tetrachloride and 5 millimoles of aluminum trihexyl in 10 cc. of anhydrous n-heptane. The catalyst thus obtained is sent into the reactor under nitrogen pressure.

The gaseous ethylene-nitrogen mixture is continuously fed and discharged at a rate of about 30 Nl./h. After 7 hours, the reaction is stopped by the addition of 10 cc. of methanol containing 0.1 g. phenyl-beta-naphthylamine. The product is purified and separated as in Example 1. After vacuum drying, 1.2 g. of solid copolymer, amorphous at the X-rays and completely soluble in boiling n-heptane, is obtained.

The radiochemical analysis shows the copolymer contains an amount of ethylene equal to 20% by weight (corresponding to 60% by moles).

The infrared examination shows the presence of unsaturations (6 micron bands).

Example 3

The copolymerization apparatus consists of glass cylindrical reactor, having a capacity of 200 cc., provided with a side-tube having a cock for the ethylene feed. The reactor is dipped in a thermostatic bath cooled down to −30° C., and placed under nitrogen.

It is kept agitated through a shaking stirring (50 shakes per minute). Into the apparatus 10 g. (0.083 moles) of cyclooctadiene-1,5, previously dried on sodium sulphate and rectified in the column, are placed. A catalytic mixture prepared by mixing 3.6 millimoles of vandium tetrachloride and 9.0 millimoles of aluminum tri-n-hexyl in 37 cc. of anhydrous heptane is added.

The solution of the catalyst is preformed by mixing the catalyst-forming components in the heptane, under stirring, in a flask cooled down to −30° C. and in a nitrogen atmosphere.

An absolute pressure of 750 torr. is established in the co-polymerization vessel by means of nitrogen. After starting the stirring in the copolymerization apparatus, the latter is connected with a container of radioactive ethylene having a known specific activity, applying, by means of a bubbler filled with butyl phthalate, a partial ethylene pressure of 50 torr.

The total absolute pressure in the copolymerization apparatus is thus raised to 800 torr. The copolymerization apparatus is then agitated for 7 hours., the pressure of 800 torr. being maintained. After 7 hours, the reaction is poured into a methanol excess (500 cc.) containing 5 cc. of concentrated hydrochloric acid. After a few hours the precipitated copolymer is filtered, washed with boiling methanol and dried under reduced pressure at 100° C.

0.630 g. of white, powdery copolymer is thus obtained.

The copolymer is soluble in some boiling hydrocarbon solvents (such as m-xylol or tetralin), but is insoluble, for example, in methanol, acetone or methylethylketone. Boiling ethyl ether dissolves about 20% of the total copolymer.

The ethylene content of the copolymer, determined by radiochemistry, is 68% by weight (89% by moles). Examination of the infrared absorption spectrum of the copolymer shows the presence of double bonds, in a quantity corresponding to a 30–35% content of the units deriving from the cyclooctadiene-1,5. This confirms that only one of the two double bonds contained in the starting cyclooctadiene-1,5 has been used in the formation of the copolymer, while the other double bond persists in the main chain of the copolymer.

X-rays examination of the copolymer shows the presence of crystallinity bands, characteristic for sequences of ethylene units. The shifting from the position of large absorption, normally due to amorphous polyethylene, towards lower angles, (2ϑ for radiations CuKα, at about 16–18°), together with the appearance of a second large absorption peak due to an amorphous phase, shows that the copolymerizate also contains an amorphous copolymer.

The intrinsic viscosity of the copolymerizate determined in tetralin at 135° C., is 2.8.

Example 4

Using the same procedure as described in Example 3 and the same reagents in the same conditions, but carrying out the copolymerization at −50° C. instead of −30° C., there is obtained 0.560 g. of a white, powdery copolymerizate having an ethylene content, determined by radio-chemistry, of 72% by weight (91% by moles) and containing, also, units derived from cyclooctadiene-1,5 each of which units contains, as it exists in the copolymer, a double bond, the latter being shown by infrared examination of the absorption spectrum. The copolymer shows, on X-ray examination, besides an amorphous phase due to amorphous copolymer segments, the crystallinity bands characteristic for sequences of ethylene units. Its intrinsic viscosity, determined in tetralin at 135° C., is 3.6. Its properties are analogous to those of the copolymerizate of Example 3.

Example 5

Example 3 is repeated except that the catalyst is preformed by mixing 2.8 millimoles of vanadium triacetylacetonate and 14 millimoles of diethyl aluminum monochloride in 30 cc. of toluene, under the conditions described in Example 3.

0.490 g. of a white, plastic copolymer are obtained. The quantitative analysis of its composition, performed as described in Example 3, shows that the copolymer contains 60% by weight (85% by moles) of units derived from ethylene, and 40% by weight of units derived from the cyclooctadiene-1,5.

Each unit of cyclooctadiene-1,5 in the copolymer contains a double bond.

The X-ray examination of the copolymer shows, besides weak diffraction bands characteristic for sequences of ethylene units, a large absorption due to the amorphous phase, and the position of which is in the range of 2 $\vartheta$ (radiations CuK $\alpha$ of 16–17°).

The copolymer has an intrinsic viscosity, determined in tetralin at 135° C., of 2.2.

This copolymerizate is more soluble in organic solvents than the copolymerizates of Examples 3 and 4, approximately 48% thereof being soluble in boiling ether.

Example 6

Example 3 is repeated, except 10 g. (0.062 mole) of 1,5,9-cyclododecatriene is used as co-monomer with the ethylene.

0.260 g. of a white powdery copolymerizate are obtained. It contains 94% by weight (99% by moles) of units derived from ethylene and 6% by weight of units derived from the cyclododecatriene-1,5,9, each of which latter units contains, in the copolymer, two double bonds, as shown by examination of the infrared absorption spectrum. X-ray examination shows, besides a large absorption due to an amorphous phase, strong crystallinity bands characteristic for polyethylenic type sequences.

The intrinsic viscosity of the copolymerizate, determined in tetralin at 135° C., is 4.6.

While the copolymerizates may comprise some macromolecules in which sequences of units derived from ethylene or from a higher alpha-olefin occur, the copolymerizates do not comprise macromolecules having sequences of units derived from the cyclopolyene or alkyl-substituted cyclopolyene. The single cyclopolyene units still containing a double bond are distributed along the length of the copolymeric macromolecular main chain, resulting in the distribution of the unsaturations along the chain, and this permits of obtaining vulcanizates which are essentially uniform throughout.

The invention is illustrated in terms of copolymerizates of ethylene and cyclooctadiene-1,5 or cyclododecatriene-1,5,9 made up of macromolecules which are linear for substantially the entire length of the main chain. Higher alpha-olefins which can be used instead of ethylene are propylene, butene-1, pentene-1, hexene-1, heptene-1, and octene-1.

Similar copolymerizates which are either completely amorphous under the X-rays, or which may show crystallinity that disappears when the products are vulcanized but reappears when the vulcanized products are stretched, can be obtained, also, by substituting a higher alpha-olefin of the formula CH$_2$=CHR, R being an alkyl radical containing 1 to 6 carbon atoms, and particularly propylene or butene-1, for the ethylene shown in the illustrative examples, and by copolymerizing other non-conjugated cyclopolyenes and alkyl-substituted cyclopolyenes with either ethylene or one of said higher alpha-olefins, under the conditions and with the catalysts disclosed.

Obviously, other modifications may be made in carrying out the invention without departing from the spirit thereof, and therefore we intend to include in the scope of the appended claims all variations which will be apparent to those skilled in the art from the disclosures made, and illustrative examples given, herein.

We claim:

1. Unsaturated, essentially linear, high molecular weight normally solid copolymerizates of polyenes selected from the group consisting of monocyclic non-conjugated polyenes and alkyl-substituted monocyclic non-conjugated polyenes in which alkyl groups are the only substituents, with ethylene, in which copolymerizates two units of the polyene are not directly linked to each other.

2. Unsaturated copolymerizates according to claim 1 further characterized in containing about 50 mole percent of the monoolefin, and in consisting of macromolecules showing, along the marcomolecular main chain, sequences in which single units of the polyene alternate regularly and successively with single units of the monoolefin.

3. Unsaturated, substantially linear, high molecular weight, normally solid copolymerizates of ethylene with cyclooctadiene-1,5, in which two units of the cyclooctadiene-1,5 are not linked directly to each other.

4. Unsaturated, substantially linear, high molecular weight, normally solid copolymerizates of ethylene with cyclododecatriene-1,5,9, in which two units of the cyclodecatriene-1,5,9 are not directly linked to each other.

5. Unsaturated, substantially linear, high molecular weight, normally solid copolymerizates of ethylene with a polyene selected from the group consisting of cyclic non-conjugated polyenes and cyclic alkyl-substituted non-conjugated polyenes in which two units of the polyene are not directly linked to each other, said copolymerizates containing less than 70 mole percent ethylene and exhibiting noncrystallinity of the polyethylene type when examined under the X-rays.

6. Manufactured shaped articles comprising unsaturated copolymerizates according to claim 1.

7. Elastomers comprising vulcanizates of unsaturated coploymerizates according to claim 1.

8. Manufactured shaped articles of vulcanizates according to claim 7.

9. A process for producing unsaturated, substantially linear, high molecular weight copolymerizates of polyenes selected from the group consisting of monocyclic non-conjugated polyenes and monocyclic alkyl-substituted non-conjugated polyenes in which alkyl groups are the only substituents, with ethylene, which process comprises polymerizing a mixture of the comonomers, in the liquid phase, in contact with a halogen-containing catalyst obtained by mixing a hydrocarbon-soluble vanadium compound selected from the group consisting of vanadium halides, oxyhalides, and compounds in which at least one of vanadium valences is saturated by an atom selected from the group consisting of oxygen and nitrogen atoms, with a compound selected among organometallic compounds and hydrides of aluminum.

10. The process according to claim 9, characterized in that the catalyst is obtained by mixing a vanadium compound with an alkyl aluminum compound.

11. The process according to claim 9, characterized in that the catalyst is obtained by mixing a hydrocarbon-soluble vanadium compound in which at least one of the vanadium valences is satisfied by an oxygen atom linked to an organic group, with a halogen-containing organometallic compound of aluminum.

12. The process according to claim 9, characterized in that the catalyst is obtained by mixing a hydrocarbon-soluble vanadium compound in which at least one of the vanadium valences is satisfied by a nitrogen atom linked to an organic group, with a halogen-containing organometallic compound of aluminum.

13. The process according to claim 9, characterized in that the mixed monomers are copolymerized at a temperature between $-80°$ C. and $125°$ C.

14. The process according to claim 9, characterized in that the catalyst is prepared at a temperature between 0 and $-80°$ C., and the mixed monomers are copolymerized therewith at a temperature in said range.

15. The process according to claim 9, characterized in that the catalyst is obtained by mixing an alkyl aluminum halide with vanadium triacetylacetonate, and the mixed monomers are copolymerized therewith at a temperature between 0 and $125°$ C., in the presence of from about 0.05 mole to 1.0 mole per mole of the alkyl aluminum halide of at least one complexing agent selected from the group consisting of ethers, thioethers, tertiary amines, tri-substituted phosphines containing a branched alkyl group, and tri-substituted phosphine containing an aromatic group.

16. The process according to claim 15, but in which the catalyst is obtained by mixing an alkyl aluminum halide with a vanadyl trialcoholate.

17. The process according to claim 15, but in which the catalyst is obtained by mixing an alkyl aluminum halide with a vanadyl halo-alcoholate.

18. The process according to claim 9, characterized in that the catalyst is obtained by mixing an aluminum trialkyl with a vanadium halide in a molar ratio of the trialkyl to the vanadium halide between 1 and 5.

19. The process according to claim 9, characterized in that the catalyst is obtained by mixing an aluminum trialkyl with a vanadium halide in a molar ratio of the trialkyl to the vanadium halide between 2 and 4.

20. The process according to claim 9, characterized in that the catalyst is obtained by mixing an aluminum trialkyl with a vanadium oxyhalide in a molar ratio of the trialkyl to the vanadium oxyhalide between 1 and 5.

21. The process according to claim 9, characterized in that the catalyst is obtained by mixing an aluminum trialkyl with a vanadium oxyhalide in a molar ratio of the trialkyl to the vanadium oxyhalide between 2 and 4.

22. The process according to claim 9, characterized in that the catalyst is obtained by mixing diethyl aluminum monochloride with vanadium triacetylacetonate in a molar ratio of the monochloride to triacetylacetonate between 2 and 20.

23. The process according to claim 9, characterized in that the catalyst is obtained by mixing diethyl aluminum monochloride with vanadium triacetylacetonate in a molar ratio of the monochloride to triacetylacetonate between 4 and 10.

24. The process according to claim 9, characterized in that the mixed monomers are copolymerized in the liquid state, in the absence of an extraneous liquid copolymerization medium.

25. The process according to claim 9, characterized in that the mixed monomers are copolymerized in an inert hydrocarbon solvent.

26. The process according to claim 9, characterized in that the mixed monomers are copolymerized in an inert inert halogenated hydrocarbon solvent.

27. The process according to claim 9, characterized in that the copolymerization of the mixed monomers is carried out continuously, and increments of the catalyst-forming components are added periodically to the system for maintaining the relative concentrations of the monomers in the liquid phase substantially constant during the copolymerization.

28. The process according to claim 9, characterized in that the mixed monomers are copolymerized continuously, the catalyst-forming components being added continuously to the system for maintaining the relative concentrations of the monomers in the liquid phase substantially constant during the copolymerization.

29. Vulcanizable high molecular weight normally solid bipolymers of ethylene and a monocyclic, non-endocyclic, non-conjugated polyene prepared by contacting a mixture of the monomers with a catalyst consisting of an organometallic compound of aluminum and a hydrocarbon-soluble vanadium compound.

References Cited

UNITED STATES PATENTS

| 3,113,115 | 12/1963 | Ziegler et al. | 260—94.9 |
| 3,081,287 | 3/1963 | Coover et al. | 260—93.7 |
| 2,886,608 | 5/1959 | Drysdale | 260—666 |

FOREIGN PATENTS

| 228,056 | 5/1960 | Australia. |
| 785,314 | 10/1957 | Great Britain. |

JOSEPH L. SCHOFER, *Primary Examiner.*

M. B. KURTZMAN, *Assistant Examiner.*

U.S. Cl. X.R.

260—2, 103, 348, 398, 488, 612, 614

UNITED STATES PATENT OFFICE
CERTIFICATE OF CORRECTION

Patent No. 3,453,250          Dated July 1, 1969

Inventor(s) Giulio Natta, Giorgio Mazzanti, et al

It is certified that error appears in the above-identified patent and that said Letters Patent are hereby corrected as shown below:

Column 6, lines 36-37 the word "product" omitted after "reaction"

Column 9, line 23, "phosphine" should read -- phosphines --.

Column 10, line 15, "inert" appears twice, cancel one;

Signed and sealed this 7th day of January 1975.

(SEAL)
Attest:

McCOY M. GIBSON JR.          C. MARSHALL DANN
Attesting Officer            Commissioner of Patents